United States Patent
Sutton

(10) Patent No.: US 10,156,911 B2
(45) Date of Patent: Dec. 18, 2018

(54) CONTENT DISPLAY CONTROL WITH A DEFORMABLE DISPLAY SCREEN

(71) Applicant: Facebook, Inc., Menlo Park, CA (US)

(72) Inventor: Charles Matthew Sutton, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 16 days.

(21) Appl. No.: 15/397,669

(22) Filed: Jan. 3, 2017

(65) Prior Publication Data

US 2018/0188825 A1 Jul. 5, 2018

(51) Int. Cl.
*G06F 3/03* (2006.01)
*G06F 1/16* (2006.01)
*G06F 3/0484* (2013.01)
*G06F 3/0483* (2013.01)
*G06F 3/0481* (2013.01)

(52) U.S. Cl.
CPC .............. *G06F 3/03* (2013.01); *G06F 1/1652* (2013.01); *G06F 1/1677* (2013.01); *G06F 3/04845* (2013.01); *G06F 3/0304* (2013.01); *G06F 3/0483* (2013.01); *G06F 3/04815* (2013.01); *G06F 2203/04806* (2013.01)

(58) Field of Classification Search
CPC ........................................................ G06F 3/03
See application file for complete search history.

(56) References Cited

U.S. PATENT DOCUMENTS

| | | | | |
|---|---|---|---|---|
| 2013/0265221 A1* | 10/2013 | Lee | ........................... | G06F 3/01 345/156 |
| 2013/0265262 A1* | 10/2013 | Jung | ....................... | G06F 3/041 345/173 |
| 2014/0078088 A1* | 3/2014 | Seo | ........................ | G06F 1/1626 345/173 |
| 2014/0101560 A1* | 4/2014 | Kwak | ................... | G06F 1/1652 715/738 |

* cited by examiner

Primary Examiner — Chun-Nan Lin
(74) Attorney, Agent, or Firm — Fenwick & West LLP

(57) ABSTRACT

A display device includes a display screen for displaying content items to a user. The display screen is deformable and can display a content item in various display modes. Deformation of the display screen caused by a deforming action of the user, e.g., bending the display screen along a rigid axis, changes the display mode of the content item displayed on the display screen. A sensor module in the display device detects the deforming action and determines the action type of the deforming action. A controller in the display device analyzes the content type of the content item, e.g., video, map or e-book. Based on the action type of the deforming action and the content type of the content item, the controller generates a command to change the display mode. The display screen displays the content item in a different display mode after executing the command.

19 Claims, 4 Drawing Sheets

| Content Type 310 | Action Type 320 | Command 330 |
|---|---|---|
| Map | Pulling | Zoom In |
| | Pushing | Zoom Out |
| | Shearing | Update Content Item |
| | Tensioning | Earth View |
| | Compressing | 3D View |
| Book | Pulling | Zoom In |
| | Pushing | Zoom Out |
| | Folding | Next Page |
| | Reverse folding | Last Page |
| | Shearing | Update Content Item |
| Video | Pulling | Zoom In |
| | Pushing | Zoom Out |
| | Folding | Fast Forward |
| | Reverse folding | Fast Backward |
| | Shearing | Secure Mode |
| | Tensioning | Pause |
| | Compressing | Resume |

| Content Type 310 | Action Type 320 | Command 330 |
|---|---|---|
| Map | Pulling | Zoom In |
| | Pushing | Zoom Out |
| | Shearing | Update Content Item |
| | Tensioning | Earth View |
| | Compressing | 3D View |
| Book | Pulling | Zoom In |
| | Pushing | Zoom Out |
| | Folding | Next Page |
| | Reverse folding | Last Page |
| | Shearing | Update Content Item |
| Video | Pulling | Zoom In |
| | Pushing | Zoom Out |
| | Folding | Fast Forward |
| | Reverse folding | Fast Backward |
| | Shearing | Secure Mode |
| | Tensioning | Pause |
| | Compressing | Resume |

FIG. 3

CONTENT DISPLAY CONTROL WITH A DEFORMABLE DISPLAY SCREEN

BACKGROUND

This disclosure relates generally to display device and specifically relates to a display device including a deformable display screen, where content displayed on the display screen is dynamically adjusted in response to a user bending the deformable display screen.

A display screen presents information to viewers in a visual form, such as through alphanumeric or graphic display. Display screens are essential for most electrical/electronic devices, including desktop or a laptop computers, mobile phones, personal digital assistants (PDA), electronic book (e-book) readers, etc. A display device usually provides a user interface, with which a user may interact with the device to perform various actions. Examples of user actions include browsing webpages, reading articles/books, watching videos, and listening to audios. Existing user interface of a display device for facilitating user actions include physical and/or on-screen buttons. However, it is often not intuitive to use physical and/or on-screen buttons. First, users need to learn the functions of the buttons in order to understand how to control display on a display screen. Second, users often have to pause to press the buttons and therefore, user actions are interrupted, which degrades user experience with display screens and electrical/electronic devices.

SUMMARY

A solution is provided to allow a user of a deformable display screen of a display device to bend the display screen in a variety ways, e.g., horizontally or vertically, where content displayed on the display screen is dynamically adjusted (e.g., zoomed in or zoomed out) in response to the user bending the deformable display screen. The display device includes a display screen displaying content items to a user of the display device. The display screen can display a content item in various display modes according to a corresponding content type (e.g., a book, map or video). The content item can be a map, a book, or a video. Display modes available for a content item can vary based on the content type of the content item. The display screen is deformable, e.g., bendable, and therefore can be deformed by a deforming action performed by the user, such as bending the display screen vertically. The user may perform a deforming action on the display screen while a content item is being displayed in a first display mode (e.g., normal book reading mode). In response to such a deforming action from the user, the content displayed on the display screen is changed from the first display mode to a second display mode (e.g., zoom in mode).

A sensor module embedded with the display device determines the action type of a user's deforming action. For determination of the action type, the sensor module detects either the force applied on the display screen by the user performing the deforming action or the deformation of the display screen caused by the deforming action. A controller in the display device analyzes the content type of the content item displayed on the display screen at the time of the deforming action. Based on the action type of the deforming action and the content type of the content item, the controller generates a command to change the display mode in response to the user's deforming action. The display screen, receiving the executed command, displays the content item in the determined display mode.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 shows examples of association between deforming action types and content types with commands for controlling display modes of the display screen, in accordance with an embodiment.

DETAILED DESCRIPTION

System Overview

Figure 1:
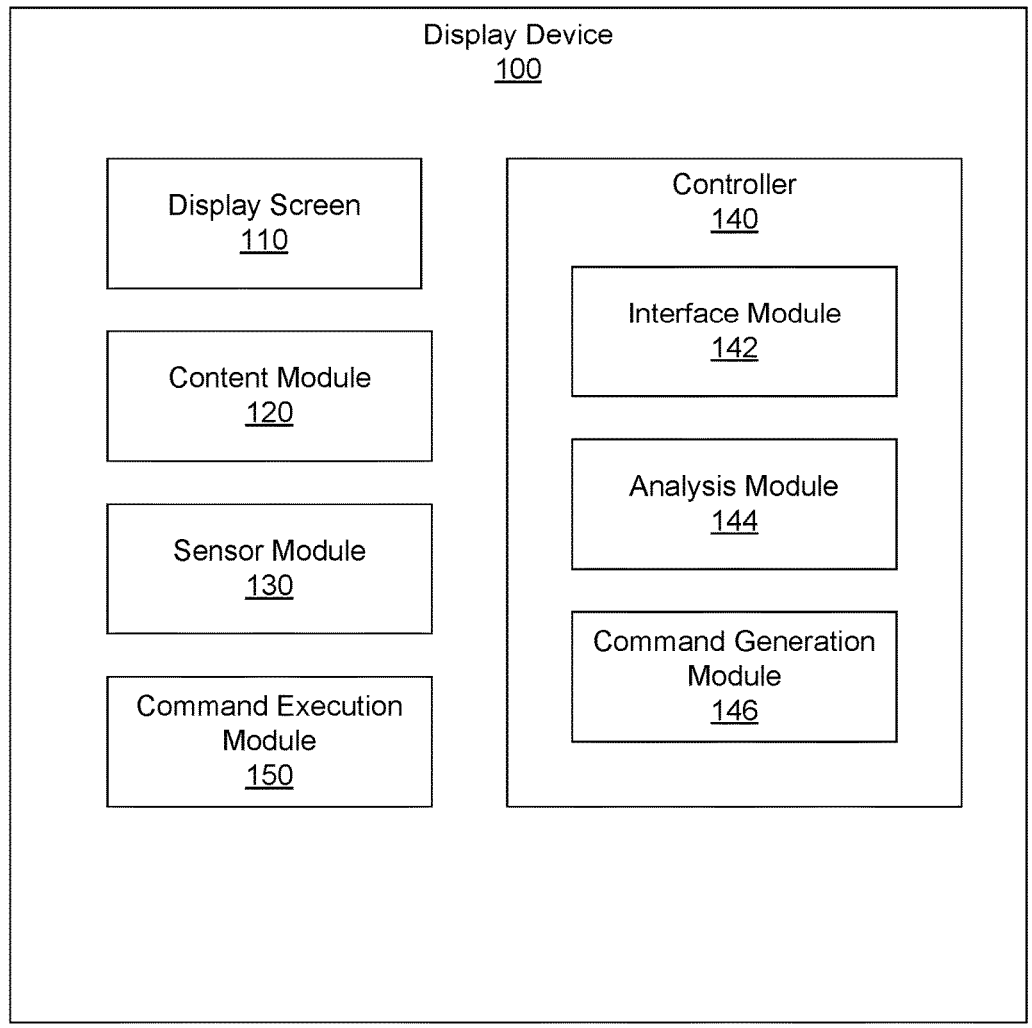
FIG. 1 is a block diagram of a display device with a deformable display screen that can be bended by a user of the display device, in accordance with an embodiment.

FIG. 1 is a block diagram of a display device 100 with a deformable display screen 110 that can be bended by a user of the display device, in accordance with an embodiment. In the embodiment shown in FIG. 1, the display device 100 is an electronic device used by one or more users to perform functions such as consuming digital content, executing software applications, browsing websites hosted by web servers, downloading files, and interacting with online systems. Various embodiments of the display device 100 include a conventional computer system, such as a desktop or a laptop computer, and a device having computer functionality, such as a personal digital assistant (PDA), a mobile telephone, an e-book reader, or other suitable devices. Different display devices 100 may have different characteristics such as different processing capabilities, different connection speeds with the Internet, and different device types (e.g., make, manufacture, and version).

In the embodiment of FIG. 1, the display device 100 includes the display screen 110 that presents digital content to the users of the display device 100. In this disclosure, "digital content" generally refers to any machine-readable and machine-storable work product, such as digital maps, electronic books (e-books), videos, webpages, digital news content, and audio files. The following discussion focuses on digital maps, e-books and videos. However, the techniques described below can also be used with other types of digital content. For purpose of clarity and conciseness, "digital" may be occasionally omitted when describing the "digital content" in the following discussion. Digital content, regardless of its composition, may be referred to herein as one or more "content items," or as "content."

As shown in FIG. 1, the display device 100 includes the display screen 110, a content module 120, a sensor module 130, a command execution module 150, and a controller 140. Some embodiments of the display device 100 have different components than those described here. Similarly, the functions can be distributed among the components in a different manner than is described here. For example, the controller 140 or one or more modules thereof may be located on a computer device associated with the display device 100.

The content module 120 accesses digital content and presents the digital content on the display screen 110 to a user of the display device 100. In some embodiments, the digital content is provided by an online source. For example, the content module 120 executes a web browser, such as IE, GOOGLE CHROME™, or FIREFOX™, which receives web pages, maps and videos from web servers. For another example, the content module 120 interacts with web servers through an application programming interface (API) running on a native operating system, such as IOS® or ANDROID™ of the display device 100. The content module 120 may also include a data storage that stores the user's own content items such as photos/images, video files or audio files, text of a user's blogs, tweets, shared images, video or audio, social networking posts. The data storage can be a tangible computer readable storage medium or any type of storage medium suitable for storing electronic instructions. The content items from online sources or locally stored in the data storage can be selected by the user to be presented by the display screen 110.

The display screen 110 is an output device for presentation of content items to the user of the display device 100. In one embodiment, the display screen 110 is an electronic visual display that presents visual information according to the electrical input signal (analog or digital) either by emitting light or, alternatively, by modulating available light during the process of reflection or transmission. The display screen 110 can use various types of image projection technologies, such as liquid crystal display (LCD), organic light emitting diode (OLED), an inorganic light emitting diode (ILED), active-matrix organic light-emitting diode (AMOLED), transparent organic light emitting diode (TOLED), cathode ray tube (CRT), gas plasma, or some combination thereof. In some embodiments, the display screen 110 is integrated into a unit with the other entities of the display device 100. In alternative embodiments, the display screen 110 is packaged in a separate unit.

The display screen 110 may display a content item in various display modes. Display modes available for a content item can vary based on the content type of the content item. For example, display modes of a map include zooming in or zoom out, refreshing (i.e., update the map), earth view, and 3D view. Display modes of an e-book include zooming in or zoom out, refreshing, and turning to the next or last page. Display modes of a video include zooming in or zoom out, fast forward or back forward, pause, resume, and a secure mode. When displaying a video in a secure mode, playback of the video is paused and the display screen 110 dims so that the video is not visible to other parties surrounding the display screen 110. For another example of the secure mode, the display screen 110 switch to displaying a predetermined image not associated with the video so that other parties near the display screen 110 cannot see the video. Secure mode can also be available to other content types, such as map, book, webpages, images, and so on. Other display modes may also be available.

In the embodiment of FIG. 1, the display screen 110 is deformable such that a user of the display device 100 can deform the original display screen in a variety ways. The display screen 110 is configured to present a content item to a user in a first display mode of the content item. In response to a user performing a deforming action on the display screen 110, the display screen is configured to display the content item in a second display mode, which is determined based on the content type, current display mode and deforming action type. Actions types of deforming actions include dual-direction bending (folding or reverse folding), single-direction bending (pulling or pushing), tensioning, compressing, and shearing.

Figure 2:
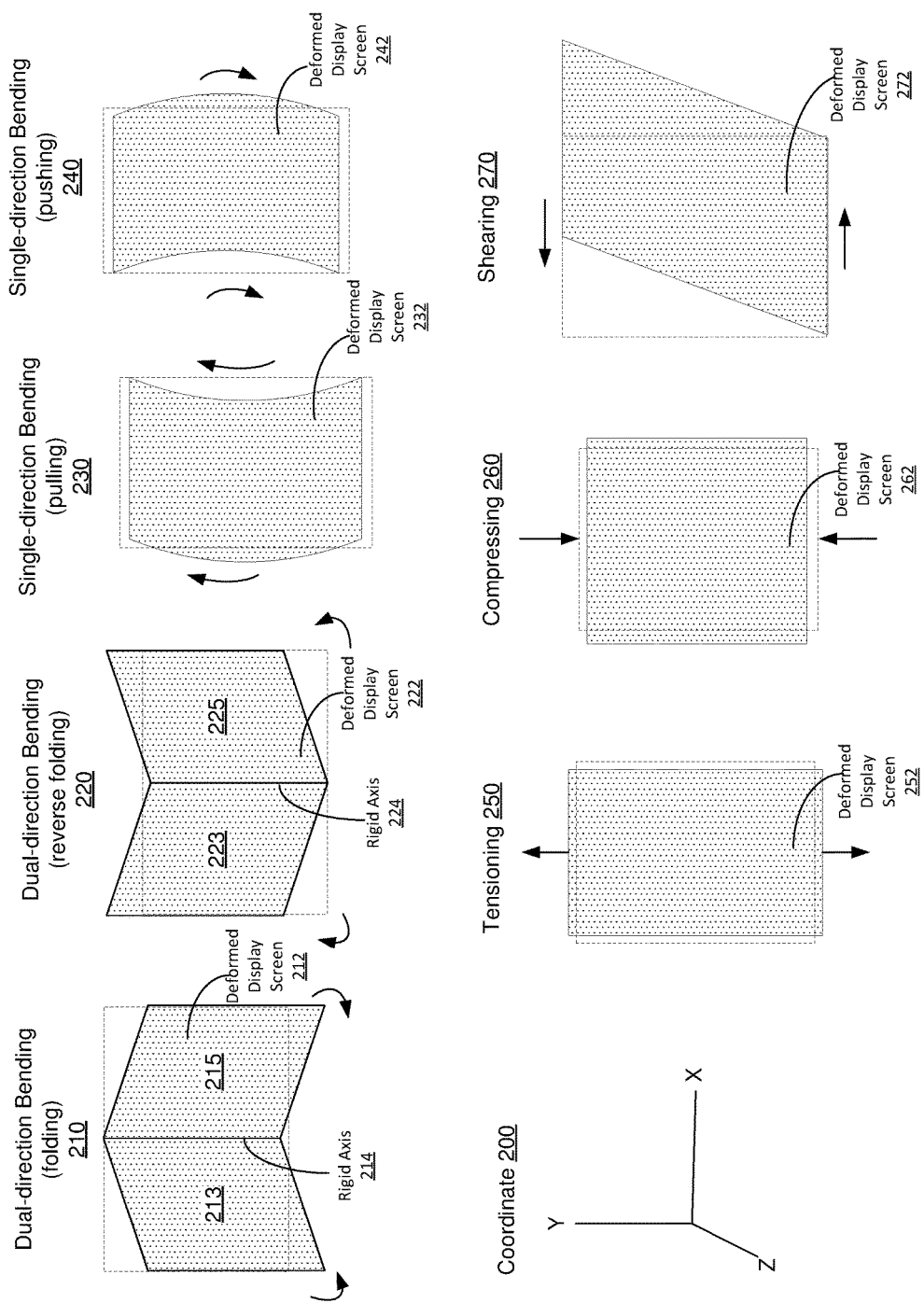
FIG. 2 shows examples of various deforming actions performed by a user of the display device on the display screen, in accordance with an embodiment.

Turning now to FIG. 2, FIG. 2 shows examples of various deforming actions performed by a user of the display device 100 on the display screen 110, in accordance with an embodiment. The shape of the display screen 110 in the embodiment of FIG. 2 is rectangular, which is represented by the dash lines. In other embodiments, the display screen 110 can be of other shapes, such as rectangular with round corners, square, circle, triangle, and so on. Also, the display screen 110 in the embodiment of FIG. 2 has one surface where content items are displayed (referred as "the front surface"). But in other embodiments, the display screen 101100 may have multiple surfaces where content items can be displayed.

As a result of each of the deforming actions, the display screen 110 is deformed. The deformed display screens are represented by the solid lines in each example shown in FIG. 2. The dot pattern represents the front surface of each deformed display screen. The opposite surface of the display screen 110 (now shown in FIG. 2) is the back surface. Directions of the force applied in the deforming actions are shown by arrows. FIG. 2 includes a coordinate 200 that includes three planes: the X-Y plane, the X-Z plane, and the Y-Z plane, where a deforming action affects content displayed on at least one of these three planes. The display screen 110 is in the X-Y plane, where the length of the display screen 110 is measured in the Y direction and the width is measured in the X direction.

In one embodiment, a deforming action is a type of bending action. FIG. 2 first shows examples of four types of bending: folding 210, reverse folding 220, pulling 230 and pushing 240. Folding 210 and reverse folding 220 are two types of dual-direction bending. Dual-direction bending is possible when the display screen 110 include a rigid axis, e.g., the rigid axis 214, in the middle of the display screen 110 (i.e., a book format). The rigid axis 214 is along the Y axis and splits the display screen 110 into two parts: 213 and 215. For the folding 210, force towards the rigid axis 214 is applied on both 213 and 215. The force is in the X-Z plane, which is perpendicular to the rigid axis 214. The bending force has two directions as shown by the two arrows. Thus, the folding 210 is a dual-direction bending. The dual-direction bending 210 results in the deformed display screen 212, where the front surfaces of the two parts 213 and 215 are bended towards the rigid axis 214. Similarly, the dual-direction bending for reverse folding 220 results in the deformed display screen 222, where the back surfaces of the two parts 223 and 225 are bended away from the rigid axis 224. But the bending force of the dual-direction bending 220 has opposite directions from the bending force of the dual-direction bending 210, and therefore the dual-direction bending 220 is referred as "reverse folding" in FIG. 2. In other embodiments, the dual-direction bending 210 may be referred as "reverse folding" and the dual-direction bending 220 is referred as "folding." Alternatively, they can be referred as other names.

Pulling 230 and pushing 240 are two types of single-direction bending. Single-direction bending does not require a rigid axis in the display screen 110. For the pulling 230 or pushing 240, the force applied on the display screen 110 is in the Y-Z plane. The pulling force and the pushing force both have one direction; and therefore, the pulling 230 and pushing 240 are single-direction bendings. The single-direction bending 230 or 240 causes the display screen 110 to curve along the X axis, resulting in the deformed display screen 232 or 242. The single-direction bending 230 is referred as "pulling" because the force is towards the front surface of the display screen 110. Likewise, the single-direction bending 240 is referred as "pushing" because the force is towards the back surface of the display screen 110. But alternatively, the single-direction bending 230 may be referred as "pushing," while the single-direction bending 240 may be referred as "pulling." Also, single-direction bending can cause the display screen 110 to curve along the Y axis, where the force applied on the display screen 110 is in the X-Z plane.

The directions of the force of the four types of bending discussed above are not in the same plane as the display screen 110, i.e., the X-Y plane. However, the directions of the force for other types of deforming actions shown in FIG. 2 can be in the same plane as the display screen 110. For example, tensioning 250 stretches the display screen 110 in the Y direction, resulting in the deformed display screen 252. Because the tensioning force is along the Y direction, the length of the deformed display screen 252 is longer than the original length of the display screen 110; while the width of the deformed display screen 252 is shorter than the original width of the display screen 110. Compressing 250 compacts the display screen 110, resulting in the deformed display screen 262. The length of the deformed display screen 262 is shorter than the original length of the display screen 110; while the width of the deformed display screen 262 is longer than the original width of the display screen 110. The tensioning force and/or the compressing force can also be in the X direction.

Shearing 270 does not cause any change in the length of the display screen 110, but it changes the shape of the display screen 110, resulting in the deformed display screen 272, when the shearing force is in X direction. Alternatively, the shearing force can be in Y direction, where the width of the display screen 110 does not change. Each deforming action shown in FIG. 2 is associated with deforming force and causes deformation of the display screen 110. Additionally, direction of the deforming force for each deforming action is different and the deformation caused by each deforming action is different. Therefore, the action type of a deforming action can be determined based on its deforming force or type of deformation of the display screen 110. Even though not shown in FIG. 2, the user may perform other types of deforming actions to the display screen 110 to change display modes of a content item. Also, the user may perform a deforming action that is a combination of one or more of the deforming actions shown in FIG. 2.

Turning back to FIG. 1, the sensor module 130 detects deforming actions of the user of the display device 100 and outputs digital signals representing the deforming actions. Deforming actions performed by the user includes bending, tensioning, compressing and shearing. The user, while performing a deforming action, applies force on the display screen 110, causing deformation of the display screen 110. The sensor module 130 may detect the deforming action by detecting either the force on the display screen 110 or the deformation of the display screen 110.

In some embodiments, the sensor module 130 includes one or more force sensors. The force sensors are embedded with the display screen 110. In an embodiment where the shape of the display screen 110 is rectangular or near rectangular, the force sensors are located on the four borders of the display screen 110. Thus, when the user deforms the display screen 110, the force sensors can detect the force applied on the display screen 110. In some other embodiments, the force sensor may be located differently, e.g., beneath the whole display screen 110.

The force sensors detect force applied by the user on the display screen 110 and convert the detected force to digital signals representing the detected force. For example, a force sensor includes a material whose electrical resistance changes when a force is applied. For another example, a force sensor is a piezoelectric sensor that measures changes in pressure and converts the pressure changes into an electrical charge. Thus, the force sensors convert the detected force to electrical signals (e.g., analog voltage or current). The sensor module 130 further converts the electrical signal to digital signals. For example, the sensor module 130 includes an Analog to Digital Converter (ADC) converting the analog voltage or current into a digital signal, e.g., binary numbers, proportional to the analog voltage or current. The ADC (not shown in FIG. 1), in some embodiments, is an electrical circuit including one or more transistors and comparators.

In alternative embodiments, the sensor module 130 includes an optical sensor that detects deformation of the display screen 110. For example, the sensor module 130 includes an optical sensor, e.g., a camera, located outside of the display screen 110. The display screen 110 is in a field of view of the camera so that the camera can capture light emitting or reflected from the display screen 110. An embodiment includes an illumination source that emits light on the display screen 110 and the camera can capture light reflected from the display screen 110. Examples of the illumination source include a lamp, a light fixture, and the sun. In another embodiment, the display screen 110 includes one or more illumination sources and the camera can capture light emitted from the illumination sources.

The camera generates digital signals based on the captured light. For example, the camera includes a plurality of pixels. A photodiode of the camera converts captured photons into electrical signals (e.g., electrical current). An ADC of the camera converts the electrical signals into digital signals. The camera reads out the digital signals of the pixels and outputs the digital signals. The sensor module 130 may include both force sensors and optical sensors. The sensor module 130 sends digital signals from the force sensor or the optical sensor or both to the controller 140 for determining the deforming action of the user.

The controller 140 analyzes outputs from the sensor module 130 and generates commands to change display mode of content items displayed on the display screen 110. In the embodiment of FIG. 1, the controller 140 includes an interface module 142, an analysis module 144, and a command generation module 146. Some embodiments of the controller 140 have different components than those described here. Similarly, the functions can be distributed among the components in a different manner than is described here.

The interface module 142 receives information from other entities of the display device 110 and outputs commands to change display modes. For example, the interface module 142 receives digital signals representing deforming actions from the sensor module 130. The interface module 142 provides the received digital signals to the analysis module 144 for processing. Also, the interface module 142 receives commands generated by the command generation module 146 and sends the command generation module 146 to the command execution module 150 of the display device 110 for execution.

The analysis module 144 analyzes the digital signals describing the deforming actions and determines the deforming actions performed by the user on the display screen 110. In the embodiments where the sensor module 130 detects deforming forces applied on the display screen 110, the analysis module 144 analyzes the digital signals to determine directions and magnitude of the force. In one embodiment, the analysis module 144 determines whether the magnitude of a force exceeds a threshold value. It is noted that a user intentionally deforms the display screen 110 when the magnitude of the force exceeds a threshold value. Thus, if the magnitude of the force does not exceed a threshold value, the analysis module 144 determining that the user did not perform any deforming action.

Upon determining that the magnitude of the force exceeds a threshold value, the analysis module 144 identifies the deforming action based on the direction of the force. As discussed above in FIG. 2, the direction of deforming force of one deforming action may be different from that of another deforming action. Thus, the direction of the deforming force distinguishes the deforming actions.

In embodiments where the sensor module 130 detects deformations of the display screen 110, the analysis module 144 analyzes digital signals generated by the sensor module 130 to determine deformation of the display screen 110. The analysis module 144 generates an image of the display screen 110, e.g., using a graphic processing unit, from the digital signals describing the deformation of the display screen 110, where the image of the display screen 110 represents the deformed display screen 110. In one embodiment, the analysis module 144 determines deformation of the display screen 110 by comparing the shape of the display screen 110 in the generated image with an original shape of the display screen 110. In another embodiment, the display screen 110 includes a plurality of reference points on its surface. The images of the display screen 110 that are generated by the analysis module 144 show the locations of the reference points on the display screen 110. By comparing the locations of the reference points in the image with the original locations of the reference points, the analysis module 144 determines the deformation of the display screen 110.

Once the deformation of the display screen 110 is determined, the analysis module 144 determines the deforming action by the user that caused the deformation. For example, if the display screen 110 is curved, the deforming action is determined to be bending. If the length of display screen 110 is increased but the width of the display screen 110 is decreased, the deforming action is determined to be tensioning. But if the length is decreased and the width is increased, the deforming action is determined to be compressing. And if there is no change in the length but the shape of the display screen 110 is changed, the deforming action is determined to be shearing.

In some embodiments, the analysis module 144 identifies the content type of the content item being displayed on the display screen 110 when the deforming action was performed. Examples of the content type include map, book, video, webpages, images, audio, and so on. In one embodiment, the analysis module 144 identifies the content type based on an attribute associated with the content item. Examples of the attribute include a file format, a title, a URL, and description of the source of the content item. For example, a content item having a file format of GIF is an image or AVI is a video; but a content item having a file format of MOBI or EPUB is a book. For another example, a content item associated with a URL is a webpage; in particular if the URL includes "www.google.com/map/," the content item is an online map.

Based on the action type of the deforming action and/or content type of the content item, the command generation module 146 generates display commands for changing display modes of the content item presented by the display screen 110 after the deforming action. For example, the command generation module 146 accesses a database (not shown in FIG. 1) that associates deforming actions and/or content types with display commands.

In some embodiments, the command generation module 146 determines a display mode based on the action type of a deforming action. For example, when the action type is identified as bending, the command generation module 146 generates commands to change the size of the content item, e.g., zoom in or zoom out, on the display screen 110. Bending towards the front surface of the display screen 110 may be associated with zooming in; while bending towards the back surface of the display screen 110 may be associated with zooming out. For another example, when the action type is identified as shearing, the command generation module 146 generates commands to update the content item. In embodiments where the content item is obtained from an online source, a command to update the content item includes a command to send a request for updated content item to the online source.

In alternative embodiments, the command generation module 146 determines a display mode based on both the action type and the content type. Turning now to FIG. 3, FIG. 3 shows examples of association between deforming action type and content type with commands for controlling display modes of the display screen 110, in accordance with an embodiment. FIG. 3 includes three content types 310: map, book and video. Each content type 310 has a different group of commands as each content type 310 may have unique display modes that are not shared with the other content types.

For a map, when the action type is pulling, the command generation module 146 generates a command to zoom in the map currently displayed on the display screen 110; when the action type is pushing, the command generation module 146 generates a command to zoom out the map. The command generation module 146 generates a command to update the map when the action type is shearing. A command to update the map, in one embodiment, causes the display device 100 to refresh the webpage where the map is accessed. Also, the command generation module 146 generates a command to obtain earth view when the action type is tensioning and a command to obtain 3D view when the action type is compressing.

For a book, the command generation module 146 generates a command to zoom in or out when the action type is pulling or pushing. The command generation module 146 generates a command to present the next page of the book when the action type is folding, and generates a command to present the last page of the book when the action type is reverse folding. Also, the command generation module 146 generates a command to update the content of the book when the action type is shearing.

For a video, when the action type is pulling or pushing, the command generation module 146 generates a command to zoom in or out a current video frame of the video. Also, the command generation module 146 generates a command to fast forward or fast backward when the action type is folding or reverse folding. There is a command to use a secure mode with a video when the action type is shearing. A secure mode hides the display of the video on the display screen 110 so that the user has privacy regarding the video the user has been viewing. For example, the display screen 110 turns blacks when the user shears the display screen 110. While the display screen 110 operates in the secure mode, the video is paused. The video may be resumed by another deforming action by the user, e.g., shearing in the opposite direction. Also, the command generation module 146 generates a command to pause the video when the action type is tensioning and a command to resume the video when the action type is compressing.

Even though not listed in FIG. 3, other combinations of content types and action types may be associated with one or more display modes. Also, other content types and actions types can be associated with commands to change display on the display screen 110. The commands generated by the command generation module 146 are provided to the command execution module 150 for executing the commands, which change a current display mode of the display screen to another display mode after the execution.

Turning back to FIG. 1, the command executed module 150 executes commands from the controller 140. The commands may be executed directly by the display screen 120. For example, the display screen 120 changes setting of text font when the command is to zoom in a book. Execution of the command may require interaction with other entities of the display device 110. For example, upon receiving a command to update a webpage, the command execution module 150 sends a request to the content module 120 to request for an updated webpage. The content module 120 then refreshes the webpage to obtain updated content.

Figure 4:
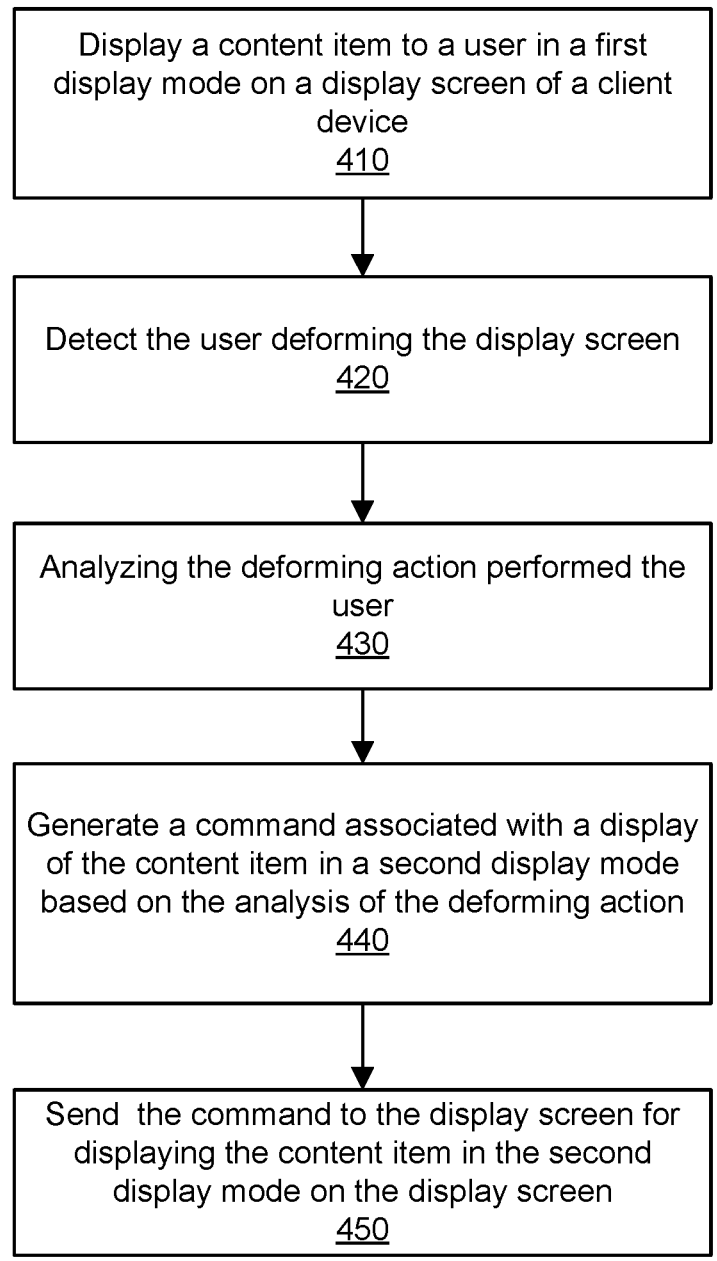
FIG. 4 is a flow chart of a process of changing display mode for a content item presented on the display screen in response to deforming actions performed by a user, in accordance with an embodiment.

FIG. 4 is a flow chart of a process of changing display mode for a content item presented on the display screen in response to deforming actions performed by a user, in accordance with an embodiment. In some embodiments, the method is performed by the display device 100, although some or all of the operations in the method may be performed by other entities in other embodiments. In some embodiments, the operations in the flow chart are performed in a different order and can include different and/or additional steps.

The display device 100 displays 410 a content item to a user in a first display mode on a display screen 110 of the display device 100. The user may deform the display screen 110 by performing a deforming action onto the display screen 110, e.g., bending the display screen 110. The display device 100 detects 420 the user deforming the display screen and analyzes 430 the deforming action performed by the user. For example, the display device 100 uses a force sensor to detect force applied on the display screen 110 and determines the action type of the deforming action based on the detected force. For another example, the display device 100 uses an optical sensor to detect deformation of the display screen 110 caused by the deforming action of the user and further determines the action type of the deforming action based on the deformation.

The display device 100 generates 440 a command associated with a display of the content item in a second display mode based on the analysis of the deforming action. In some embodiments, the display device 100 also identifies a content type of the content item and generates the command based on both the analysis of the deforming action and the identification of the content item. The display device 100 sends 450 the command to the display screen for displaying the content item in the second display mode on the display screen.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer method, comprising:
   detecting a content item on a display screen of a display device;
   detecting sensor data associated with a deforming action applied to the display screen;
   analyzing the sensor data associated with the deforming action to detect an identified action type associated with the deforming action applied to the display screen, the identified action type detected from a plurality of available action types;
   detecting an identified content type of the content item displayed on the display screen, the identified content type detected from a plurality of available content types;
   generating a selected command based on the identified content type and the identified action type by performing a lookup in a database associating the plurality of available action types and the plurality of available content types with a plurality of available commands; and
   executing the selected command to update display of the content item on the display screen.

2. The method of claim 1, wherein the plurality of available action types consists of: bending, tensioning, compressing, and shearing.

3. The method of claim 1, wherein the plurality of available content types include a map, a book, a video, a webpage, an image, and audio.

4. The method of claim 1, wherein generating the selected command comprises:
   responsive to determination that the identified action type of the deforming action is a bending action, generating the selected command of changing size of the content item.

5. The method of claim 1, wherein generating the selected command comprises:
   responsive to determination that the identified action type of the deforming action is a shearing action, generating the selected command of updating the content item.

6. The method of claim 1, wherein generating the selected command comprises:
   responsive to determination that the identified content type of the content item is a map and the identified action type of the deforming action is a tensioning action, generating the selected command of switching a current view of the map displayed to a satellite view of the map.

7. The method of claim 1, wherein generating the selected command comprises:
   responsive to determination that the identified content type of the content item is a map and the identified action type of the deforming action is a compressing action, generating the selected command of switching a current view of the map displayed to a three-dimensional view of the map.

8. The method of claim 1, wherein generating the selected command comprises:
   responsive to determination that the identified content type of the content item is a book and the identified action type of the deforming action is a folding action, generating the selected command of displaying the next page of the book.

9. The method of claim 1, wherein generating the selected command comprises:
   responsive to determination that the identified content type of the content item is a video and the identified action type of the deforming action is a folding action, generating the selected command of fast forwarding the video.

10. The method of claim 1, wherein generating the selected command comprises:
    responsive to determination that the identified content type of the content item is a video and the identified action type of the deforming action is a tensioning action, generating the selected command of pausing the display of the video.

11. The method of claim 1, wherein generating the selected command comprises:
    responsive to determination that the identified content type of the content item is a video and the identified action type of the deforming action is a compressing action, generating the selected command of resuming the display of the video.

12. The method of claim 1, wherein the one or more sensors are force sensors that measures force applied onto the display screen and generate digital signals representing the force.

13. The method of claim 1, wherein the one or more sensors are optical sensors that capture light from the display screen and convert the captured light into digital signals, wherein the digital signals provide information describing the deforming action.

14. A display device comprising:
    a display screen displaying a content item;
    one or more sensors embedded within the display device, wherein the one or more sensors detects sensor data associated with deforming actions applied to the display screen;
    a controller associated with the display device, wherein the controller:
    analyzes the sensor data associated with the deforming action to detect an identified action type associated with the deforming action applied to the display screen, the identified action type detected from a plurality of available action types;
    detects an identified content type of the content item on the display screen, the identified content type detected from a plurality of available content types;
    generates a selected command based on the identified content type and the identified action type by performing a lookup in a database associating the plurality of available action types and the plurality of available content types with a plurality of available commands; and
    executes the selected command to update display of the content item on the display screen.

15. The display device of claim 14, wherein the one or more sensors are force sensors that measures force applied onto the display screen and generate digital signals representing the force.

16. The display device of claim 14, wherein the one or more sensors are optical sensors that capture light from the display screen and convert the captured light into digital signals, wherein the digital signals provide information describing the deforming action.

17. The display device of claim 14, wherein the controller further:
    responsive to determination that the identified action type of the deforming action is a folding action and the identified content type is a video, generates the selected command of fast forwarding the video;
    responsive to determination that the identified action type of the deforming action is a tensioning action and the identified content type is the video, generates the selected command of pausing the display of the video; and responsive to determination that the identified action type of the deforming action is a compressing action and the identified content type is the video, generates the selected command of resuming the display of the video.

18. The display device of claim 14, wherein the controller further:

responsive to determination that the identified action type of the deforming action is a folding action and the identified content type is a book, generates the selected command of turning to the next page of the book;

responsive to determination that the identified action type of the deforming action is a pulling action and the identified content type is the book, generates the selected command of zooming in the book; and responsive to determination that the identified action type of the deforming action is a shearing action and the identified content type is the book, generates the selected command of updating the book.

19. The display device of claim 14, wherein the controller further:

responsive to determination that the identified action type of the deforming action is a pulling action and the identified content type is a map, generates the selected command of zooming in the map;

responsive to determination that the identified action type of the deforming action is a shearing action and the identified content type is the map, generates the selected command of updating the map; and responsive to determination that the identified action type of the deforming action is a tensioning action and the identified content type is the map, generates the selected command of changing to earth view of the map.

* * * * *

UNITED STATES PATENT AND TRADEMARK OFFICE
CERTIFICATE OF CORRECTION

PATENT NO. : 10,156,911 B2
APPLICATION NO. : 15/397669
DATED : December 18, 2018
INVENTOR(S) : Charles Matthew Sutton Page 1 of 1

It is certified that error appears in the above-identified patent and that said Letters Patent is hereby corrected as shown below:

In the Claims

Column 12, Lines 18-19, Claim 12, delete "wherein the one or more sensors are force sensors that measures" and insert -- wherein one or more sensors for detecting the sensor data are force sensors that measure --.

Column 12, Lines 22-23, Claim 13, delete "wherein the one or more sensors are optical sensors" and insert -- wherein one or more sensors for detecting the sensor data are optical sensors --.

Column 12, Line 30, Claim 14, delete "one or more sensors detects sensor data" and insert -- one or more sensors detect sensor data --.

Column 12, Line 52, Claim 15, delete "sensors that measures" and insert -- sensors that measure --.

Signed and Sealed this
Thirtieth Day of July, 2019

Andrei Iancu
*Director of the United States Patent and Trademark Office*